US010751637B1

(12) United States Patent
Kelly et al.

(10) Patent No.: US 10,751,637 B1
(45) Date of Patent: Aug. 25, 2020

(54) WEARABLE AND ILLUMINATING WINGS

(71) Applicant: LIGHTUPTOYS.COM LLC, Sellersburg, IN (US)

(72) Inventors: Christopher Kelly, New Albany, IN (US); Joshua C. Kelly, Sellersburg, IN (US); Max Armendariz Lalama, Georgetown, IN (US); Ariel Macaulay Bruton, Louisville, KY (US)

(73) Assignee: LightUpToys.com LLC, Sellersburg, IN (US)

( * ) Notice: Subject to any disclaimer, the term of this patent is extended or adjusted under 35 U.S.C. 154(b) by 0 days.

(21) Appl. No.: 16/599,253

(22) Filed: Oct. 11, 2019

Related U.S. Application Data (60) Provisional application No. 62/745,625, filed on Oct. 15, 2018, provisional application No. 62/791,076, filed on Jan. 11, 2019.

(51) Int. Cl.
| | |
|---|---|
| *F21V 33/00* | (2006.01) |
| *A63J 7/00* | (2006.01) |
| *F21V 15/01* | (2006.01) |
| *F21V 5/00* | (2018.01) |
| *F21V 23/04* | (2006.01) |
| *F21V 23/00* | (2015.01) |
| *F21V 23/02* | (2006.01) |
| *F21Y 103/10* | (2016.01) |
| *F21Y 115/10* | (2016.01) |
| *F21W 121/06* | (2006.01) |

(52) U.S. Cl.
CPC .............. *A63J 7/005* (2013.01); *F21V 5/00* (2013.01); *F21V 15/01* (2013.01); *F21V 23/002* (2013.01); *F21V 23/02* (2013.01); *F21V 23/04* (2013.01); *F21V 33/0008* (2013.01); *F21W 2121/06* (2013.01); *F21Y 2103/10* (2016.08); *F21Y 2115/10* (2016.08)

(58) Field of Classification Search
CPC .. A63J 7/005; F21V 5/00; F21V 15/01; F21V 23/002; F21V 23/02; F21V 23/04; F21V 33/0008; F21Y 2103/10; F21Y 2115/10; F21W 2121/06
See application file for complete search history.

(56) References Cited

U.S. PATENT DOCUMENTS

| | | | |
|---|---|---|---|
| 7,021,508 B1* | 4/2006 | Aston | A45F 3/00 |
| | | | 224/628 |
| 7,037,163 B2 | 5/2006 | Beard | |
| 7,175,496 B1* | 2/2007 | Lund | A63J 7/005 |
| | | | 2/88 |
| D683,537 S * | 6/2013 | Bandru | D3/217 |
| D722,234 S * | 2/2015 | BenDavid | D3/223 |
| 2004/0093653 A1* | 5/2004 | Beard | A63H 33/00 |
| | | | 2/1 |
| 2008/0173686 A1* | 7/2008 | Kennedy | A45F 3/042 |
| | | | 224/600 |

(Continued)

*Primary Examiner* — Zheng Song
(74) *Attorney, Agent, or Firm* — Scott R. Cox; Jessica C. Lindner (57) ABSTRACT

A pair of wearable, lighted wings, including a base of the wings that contain lights specifically oriented to illuminate veins of a structured body of the wings and spring-loaded hinges that connect the bases of the wings to a housing thus allowing the wings to move freely when worn by an individual.

20 Claims, 9 Drawing Sheets

(56) References Cited

U.S. PATENT DOCUMENTS

| | | | |
|---|---|---|---|
| 2011/0164406 A1* | 7/2011 | Chen | A45C 15/06 |
| | | | 362/103 |
| 2015/0264986 A1* | 9/2015 | Coleman | A45F 3/042 |
| | | | 362/156 |
| 2016/0220920 A1* | 8/2016 | Dietrick | A63J 7/005 |

* cited by examiner

WEARABLE AND ILLUMINATING WINGS

CROSS REFERENCE TO RELATED APPLICATION

This Application claims priority from provisional application Ser. No. 62/745,625, filed Oct. 15, 2018 and provisional application Ser. No. 62/791,076, filed Jan. 11, 2019.

FIELD OF THE INVENTION

The present invention relates to wearable, illuminating wings that illuminate veins of a structured body of the wings. Further, the wearable, illuminating wings include spring-loaded hinges that allow the wings to move freely so as to mimic the motion of flapping wings.

BACKGROUND

Wearable wings have existed for decades, having been used, for example, in the performing arts and worn for special events. Wearable wings that flap exist using a battery powered mechanism, as shown in U.S. Pat. No. 7,037,163. Further, wearable wings that flap have exist using a cord or cable, but these wings do not move freely as the wearer moves requiring the wearer to pull on a cable or cord to achieve a flapping motion.

Illuminating, wearable wings have also been disclosed, but these wings are generally made of cloth, and the entirety of the wing does not illuminate consistently or refract light throughout the entirety of the wing. Further, these wings do not exhibit an "edge-lit" effect on an outer surface of the wings.

SUMMARY OF INVENTION

The inventors have discovered novel wearable and illuminating wings that allows the wings to flap freely in correlation with the wearer's movement without the use of a cable mechanism. In addition, the inventors have discovered wings that illuminate consistently throughout their entirety, while also lighting the edge of an outer surface of the wings to provide an "edge-lit" effect.

One embodiment includes wearable, illuminating wings comprising a housing comprising a front and back cover that are securable to each other, wherein the front cover contains cavities and the back cover contains openings, wherein the openings of the back cover align with the cavities of the front cover when the back and front cover are secured together, and wherein, when the front cover is secured to the back cover, cradles are formed; straps, each comprising a first and second end, wherein the first end is secured to a top portion of the front cover and the second end is connected to a bottom portion of the front cover; wings, comprising a base and a wing structured body; wherein the base for each of the wings comprises front and back casings that are securable to each other, wherein a first end of each of the bases comprises a spring-loaded hinge securable within the cradles; wherein the wing structured body comprises foundations and a shaped portion, wherein the foundations are securable to the front and back casings, and wherein the shaped portions comprise veins extending from the foundations to an edge of the wings; and LEDs securable to a surface of the front and back casings

DETAILED DESCRIPTION OF DRAWINGS

In one embodiment is a pair of wearable, illuminating wings 10 shown in FIGS. 1-8. The wearable, illuminating wings include a housing 20, bases of the wings 40, spring-loaded hinges 50, straps 69 and wings 70.

Figure 1:
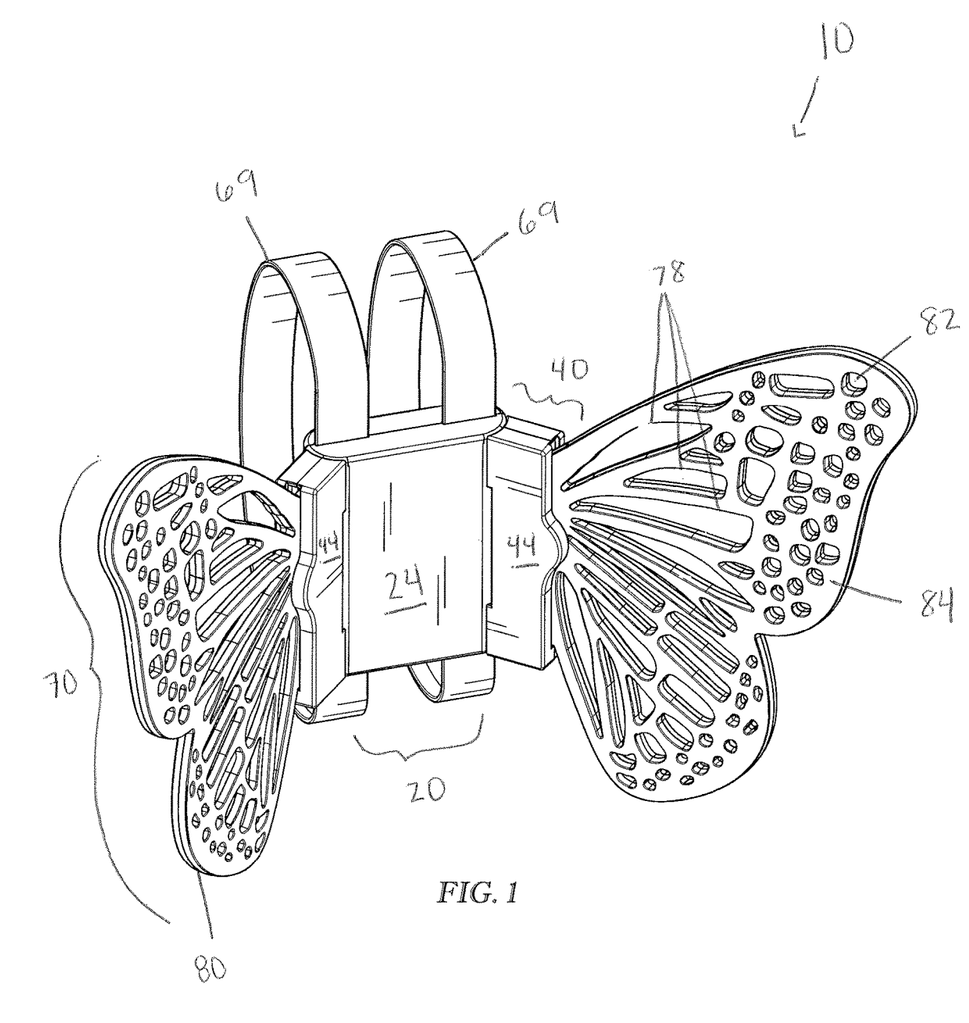
FIG. 1 is a back, perspective view of one embodiment of wearable, illuminating wings.
Figure 2:
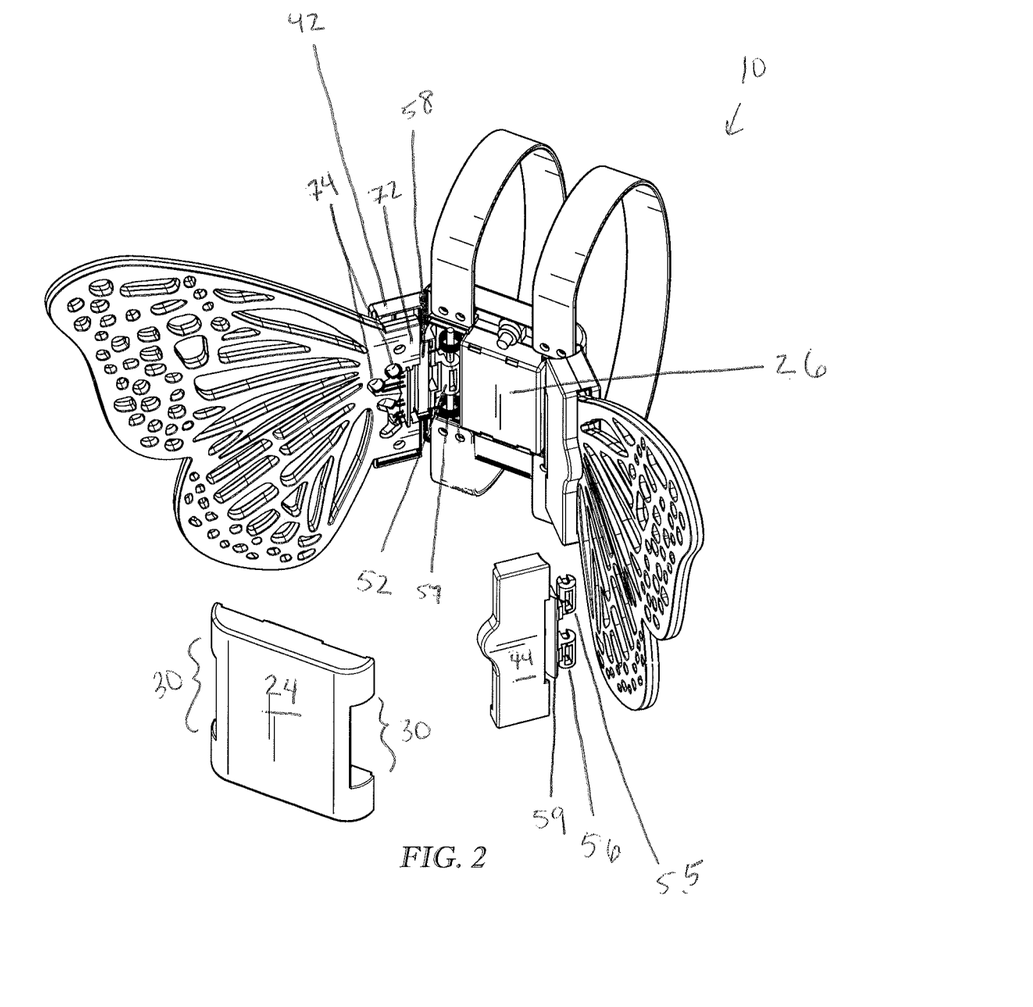
FIG. 2 is a side, partially exploded, back, perspective view of the wearable, illuminating wings of FIG. 1.
Figure 3:
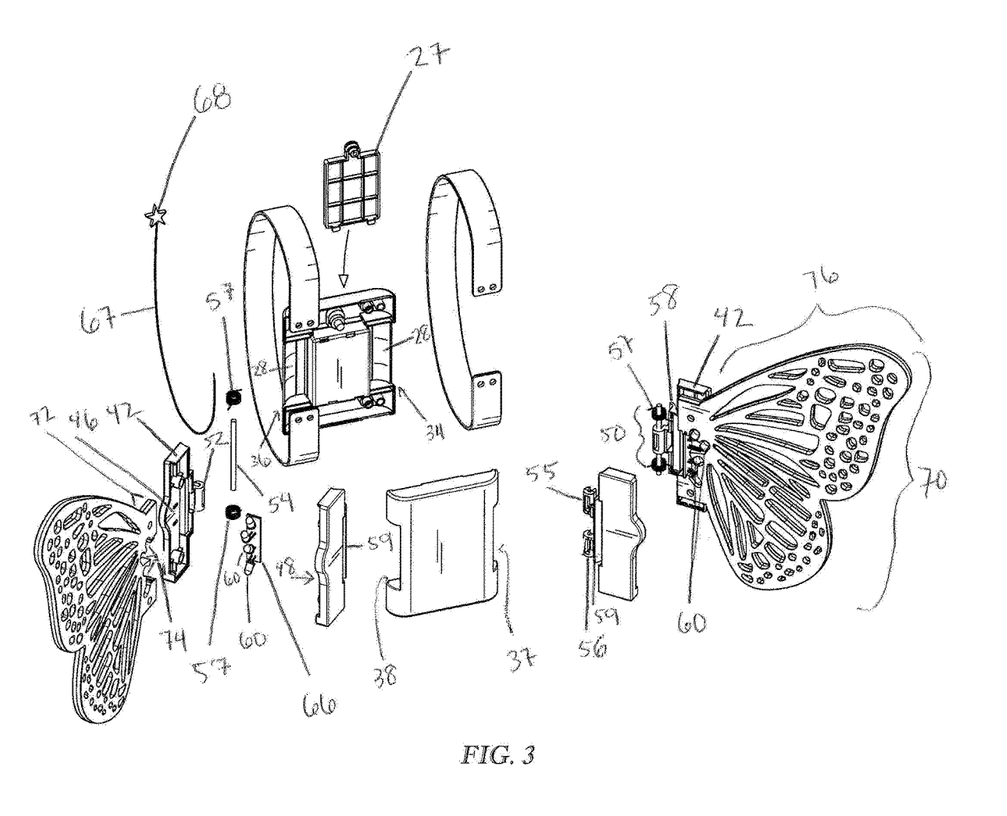
FIG. 3 is an exploded view of the wearable, illuminating wings of FIG. 1.
Figure 4:
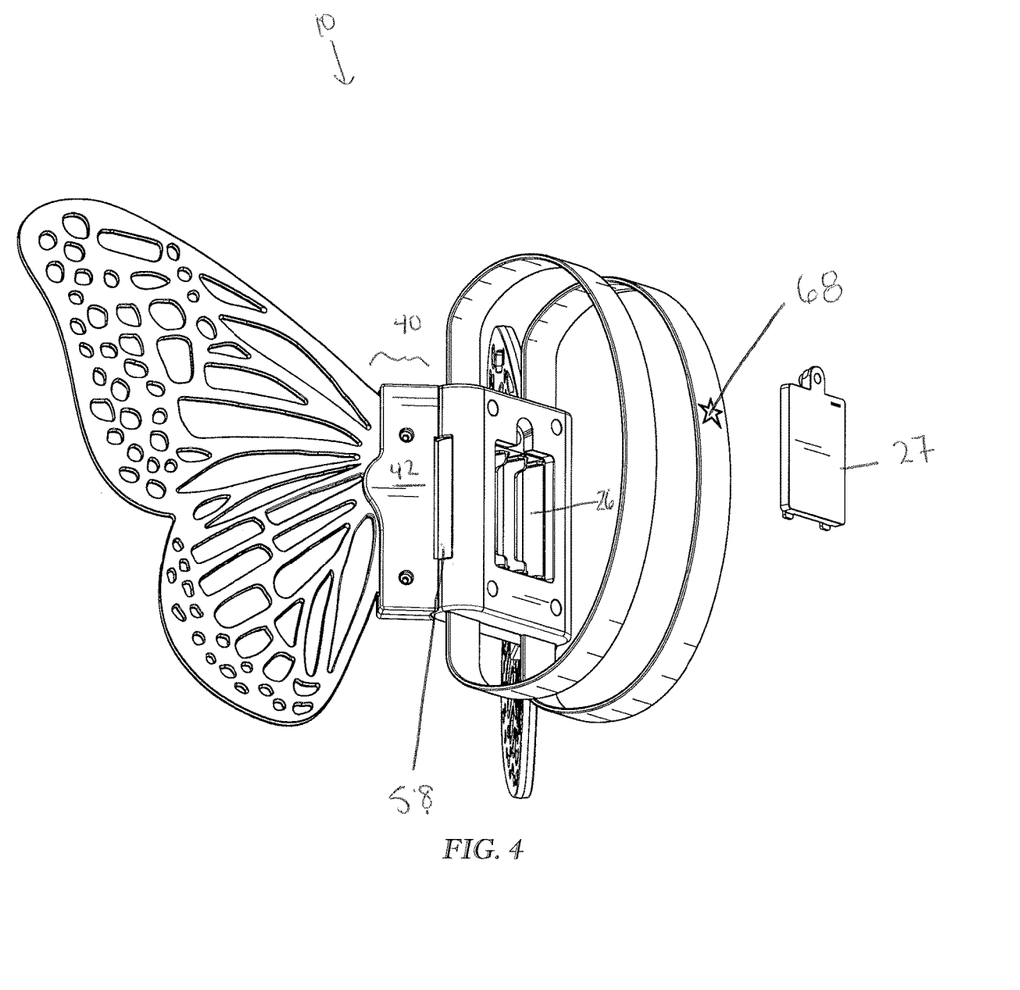
FIG. 4 is a front, perspective, view of the wearable, illuminating wings of FIG. 1 with an open-faced view of a battery compartment.
Figure 5:
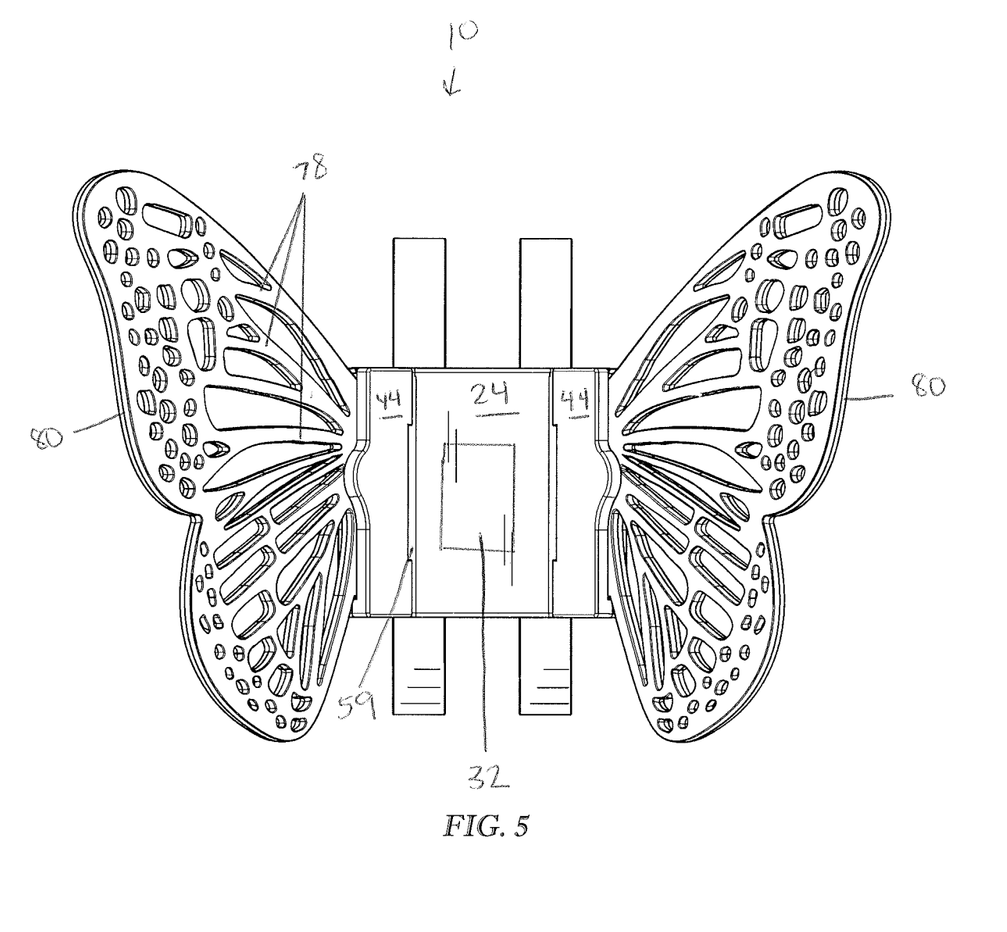
FIG. 5 is a back view of the wearable, illuminating wings of FIG. 1.
Figure 6:
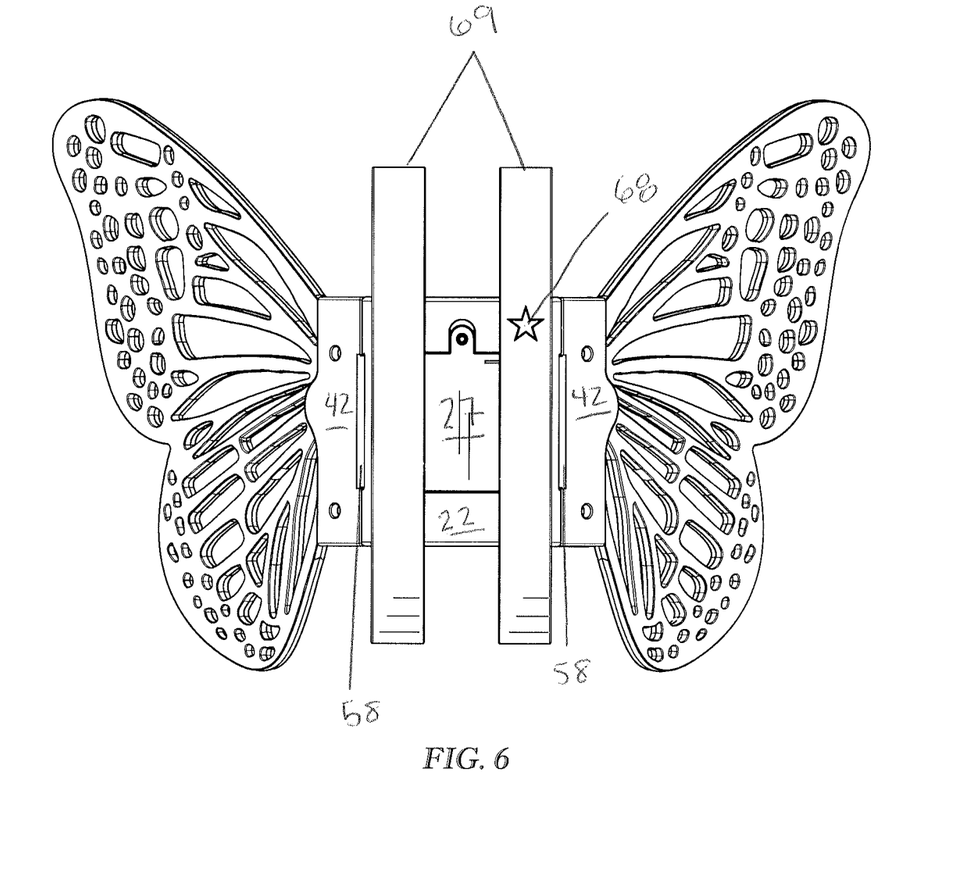
FIG. 6 is a front view of the wearable, illuminating wings of FIG. 1.
Figure 7:
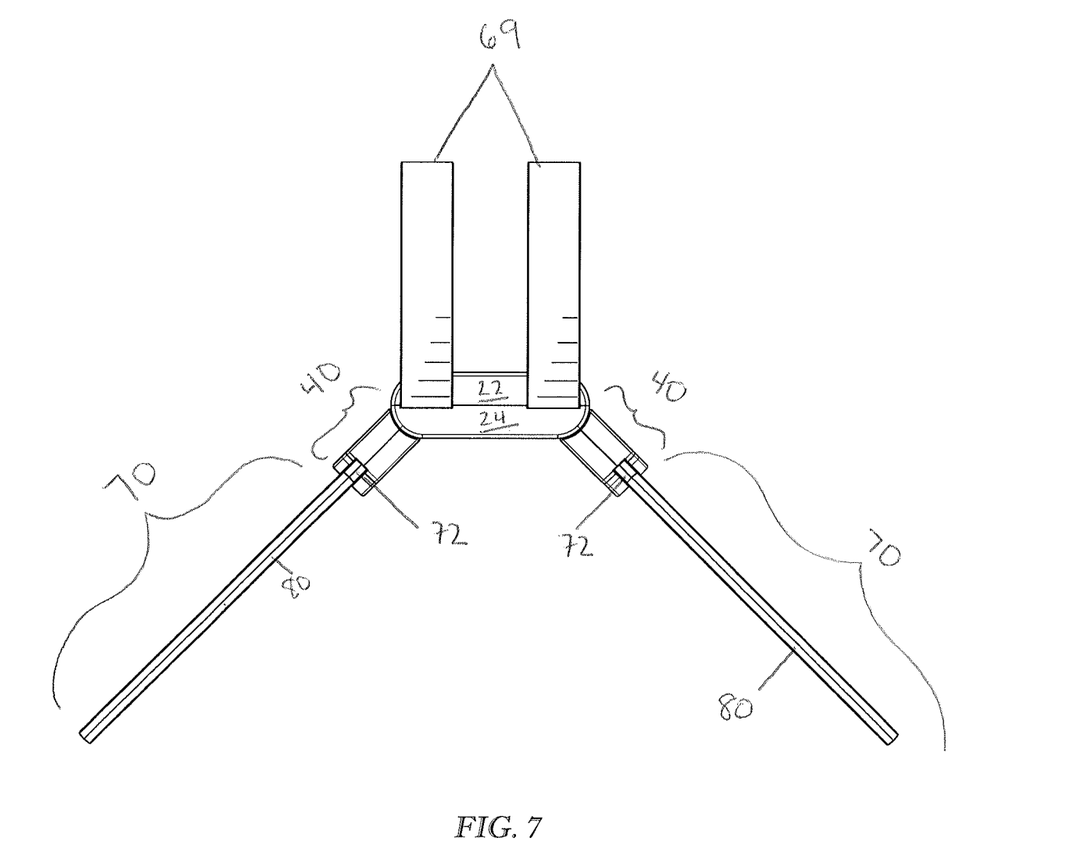
FIG. 7 is a top view of the wearable, illuminating wings of FIG. 1.
Figure 8:
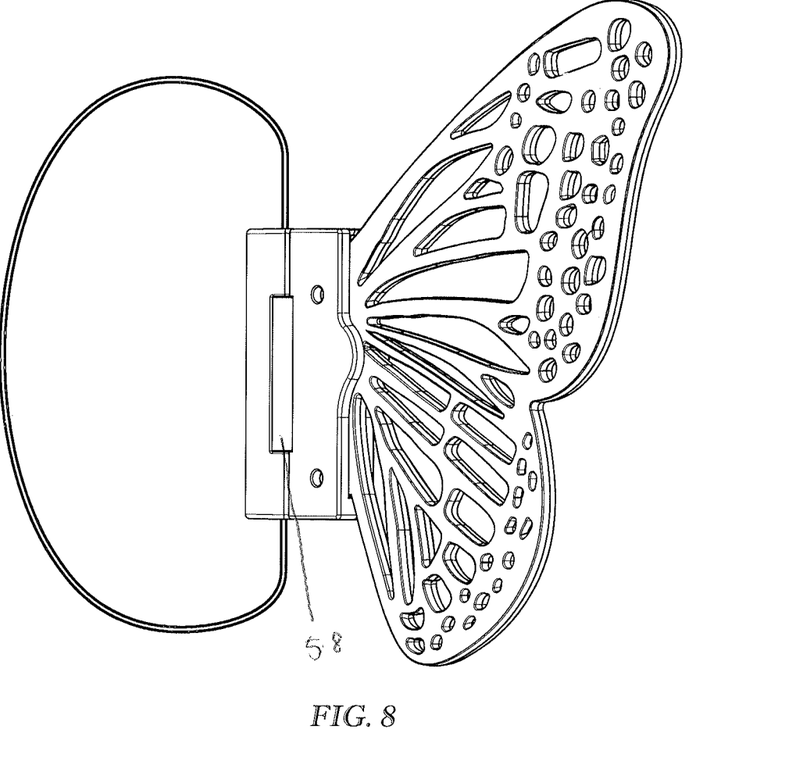
FIG. 8 is a side view of the wearable, illuminating wings of FIG. 1.
Figure 9:
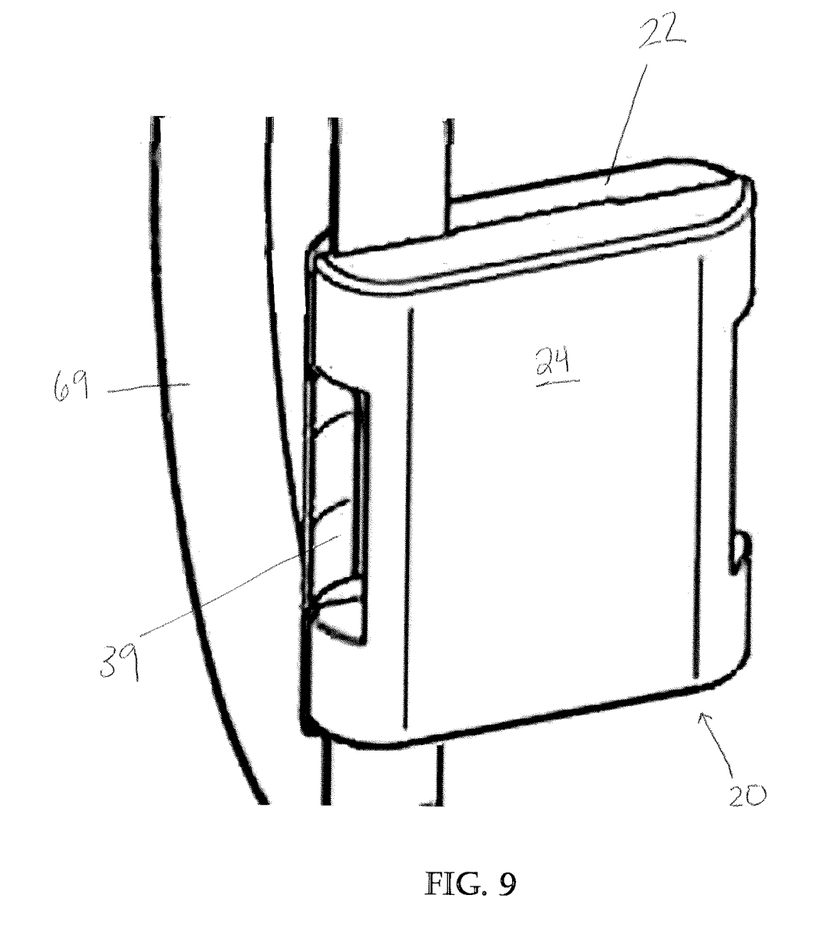
FIG. 9 is a back, side perspective view of a housing of the wearable, illuminating wings of FIG. 1.

As shown in FIGS. 1-8, the wearable, illuminating wings include a housing 20. This housing includes a front cover 22 and a back cover 24 that are securable to one another, for instance via screws as shown in FIGS. 2-3 and 6. The front cover includes a battery compartment 26 that houses batteries (not shown) that provide power to the wearable, illuminating wings. The battery compartment is located within an outside portion of the front cover and has a battery compartment door 27 that encloses the batteries, for example via screws. This is a cosmetically advantageous structure because the battery compartment is located on a wearer's back when worn, so that the battery compartment is not visible to others. The front cover additionally includes cavities 28 that are located on right and left inner, surface portions (34, 36) thereof, as shown in FIGS. 2-3. These cavities align with openings 30 on right and left inner, edge surface (37, 38) of the back cover, as shown in FIGS. 2-3. When the front and back cover are connected, the openings of the back covers align with and connect to the cavities of the front cover to form cradles 39, as shown in FIG. 9. In one embodiment, as shown in FIG. 5, an outside portion of the back cover includes a changeable aesthetic panel 32, wherein various inserts can be positioned within the panel, including different designs.

The cradles 39, as shown in FIG. 9, formed by the connection of the cavities 28 of the front cover 22 of the housing 20 and the openings 30 of the back cover 24 of the housing serve as an attachment point for the bases 40 of the wings 70 to connect to the housing 20. In the embodiment shown in FIGS. 2-3, the bases of the wings include a front and back casing (42, 44) that are connectable to one another for instance via screws. Secured to the front and back casings are spring-loaded hinges 50, which secure into the cavities of the front cover 22 of the housing 20. By this arrangement, the wings are rotationally secured to the back cover of the wing structure. In one embodiment, as shown in FIGS. 2-3, the spring-loaded hinges include a primary knuckle 52, a secondary knuckle 55, a tertiary knuckle 56, a pin 54 and springs 57. As shown in FIGS. 2-3, this embodiment of the spring-loaded hinges includes the primary knuckle secured to a middle portion of a first end of the front casing. The secondary knuckle is secured to a top portion of a first end of the back casing and the tertiary knuckle is secured to a bottom portion of the first end of the back casing. When the front and back casings are secured together, the primary knuckle secures between the secondary and tertiary knuckle. The pin is then inserted into a center opening that is aligned within the primary, secondary and tertiary knuckles. Further secured around the secondary and tertiary knuckles are springs that permit the wings to freely move. The spring-loaded hinge is then secured into the cavity of the front cover. In one embodiment, (not shown) the cavities of the front cover have a specific cut out for the pin to be secured therein. When the front and back covers of the housing are secured together, the spring-loaded hinge is rotationally secured within the cradles that are formed by the connection of the cavities and openings. The springs, preferably torsion springs, surround the pins and apply a radial force about the pins, which advantageously keeps the wings in a fixed, diagonal position while at rest to mimic the look of actual wings.

The front and back casings (42, 44) both further preferably include a stopper (58, 59) that is secured to each casing, for example by being molded into each casing. These stoppers are set at a certain preselected angle from one another, preferably from forty-five to one-hundred and twenty degrees (45-120 degrees), more preferably about ninety degrees (90 degrees). These stoppers are important element of one embodiment as they work together to allow the wings to move freely in a back and forth flapping motion but limit said movement within a preselected arc of motion. The front casing stopper 58 is surprisingly useful because, when a wearer sits down, this stopper permits the wings to lay flat against a surface that the wearer is leaning against, without extending the wings too far forward where it would adversely affect the user. The back casing stopper 59 further allows the wings to move freely with a wearer's movement but stops the wings from moving closely together and hitting one another. When the front and back casing of the bases of the wings are connected and the spring-loaded hinges 50 are secured within the cavities 28 of the front cover 22 of the housing 20, the back cover 24 of the housing secures to the front cover of the housing to secure the spring-loaded hinges within the cradles 39. Specifically, the openings of the back cover provide room for the stopper of the back casing to move at a predetermined angle and stop the wings from touching. This is advantageous because it limits or prevents the possibility damage from the wings crashing into one another when a wearer is actively moving. Further, the combination of the stoppers on each casing provides the most realistic wing motion possible. This allows a wearer to move and flap the wings whenever the wearer moves. This provides the look of flapping wings without needing a battery powered mechanism or a strap or cable, thereby creating an aesthetically pleasing wearable wing.

In one embodiment, the bases 40 of the wings 70 further include LEDs 60 secured to an inner edge (46, 48) of each the front and back casings. The LEDs can include various colors and be of varying intensity. In the embodiment shown in FIGS. 2-3, the LEDs are connected to a printed circuit board ("PCB") 66 that is also secured to the inner edge of the front and back casings of the bases of the wings. In this embodiment, wiring (not shown) runs from the printed circuit board and through the spring-loaded hinges 50 to the battery compartment 26 of the housing 20. The wiring preferably runs in a space provided underneath the primary knuckle 52 of the base of the wings. This allows the wiring to move freely with the flapping of the wings, without getting tangled or smashed. The PCB is programmed to control the LEDs so that when a user presses a switch 68 located on a surface of one of the straps 69, the LEDs can be programmed to sequence through a variety of settings, such as static on, fade, or quick flash. The LEDs can also vary in color, size, and numerosity.

Further secured to the inner edges (46, 48) of the front 43 and back casings 44 of the bases 40 of the wings 70 is a foundation 72 of the wings, as shown in FIG. 3. The foundation of the wings includes slots 74 that are molded therein. These slots are preferably shaped to fit the LEDs 60 so as to be facing towards a structured body 76 of the wings. More particularly, the structured bodies of the wings include veins 78 that extend from the foundation of the wings to an outer edge 80 of the wings. The slots of the foundations of the wings preferably align with these veins so the LEDs specifically illuminate these portions of the structured bodies of the wings. This provides a superior illumination of the wings that has is novel. The wings can be made of any material that refracts light, such as acrylic plastic. In one embodiment, this material is an acrylic plastic that permits continuous illumination of the wing and aids in the "edge-lit" effect. Further, the acrylic plastic must withstand slight bending, which is advantageous for wearable wings for use by children as these wings may be dropped numerous times. Further, the structured bodies include open 82 and non-opened 84 portions, which light may or may not refract throughout. In addition, an edge of the wings may include etched portions. When the LEDs are illuminated, they illuminate an edge of the wings so as to provide an edge-lit effect. In one embodiment, (not shown), the wings may be completely solid or open. The wings may or may not include veins.

FIGS. 2-3 show an embodiment where there are four LEDs 60 connected to four respective slots 74 located in the base 40 of the wing 70. In one embodiment, the first LED is oriented to refract light throughout the upper edge and upper veins 78 of the structured bodies 76. The second LED is situated to refract light throughout the middle upper veins of the structured body of the wing. The third LED is oriented to refract light throughout the lower middle veins of the structured body. The fourth LED is oriented to refract light throughout the lower veins of the lower portion of the structured body of the wing as well as along a lower edge of the wing. This specific orientation, along with the choice of plastic for the wing structure and placement of the LEDs within the base, provides surprising aesthetically pleasing results. Other orientations of the LEDS and the veins of the structured body of the wings can provide different, but also aesthetically pleasing results. The wings have numerous, different shapes and the orientation of the LEDs can vary depending on the location and numerosity of the veins of the various structured bodies of the wings. For example, one embodiment of the structured wings may include solid clear plastic without any veins. When the LEDs are oriented as shown in FIGS. 2-3 and the preferred plastic material is chosen, the light emitted from the LEDs advantageously refracts light throughout the entirety of the wing continuously.

The wearable, illuminating wings 10 also include straps 69. These straps are preferably adjustable and are made of any material that is comfortable for a wearer. These straps include a first end second end. The first end of each of the straps is connected above the cavities 28 of the front cover 22 of the housing 20 on an inner surface of the front cover. The second end is connected below the cavities of the front cover of the housing on an inner surface of the front cover. These straps are connected via screws and are further secured with the connection of the back cover 24 to the front cover of the housing. In the embodiment shown in FIGS. 3, 4, and 6, the straps include a switch 68 or power button that powers the illumination portion of the wings 70. This power button is advantageously located on the straps of the wings so a wearer can easily turn the illumination on and off while wearing the wings. This on/off switch is connected to wiring that passes through the straps to the battery compartment 26. This wiring is further connected to the printed circuit board connected to the LEDS that is located within the bases of the wings. This switch can also control varying functions, such as timing, light intensity, etc.

In one embodiment, the power button is located on a back surface of the back cover 24 of the housing 20 (not shown). In another embodiment, the power button is remote and can be activated via a user's phone or using RFID technology.

In one embodiment, the switch 68 can be located in a remote control, so the wearer or someone else can remotely control the wearable, illuminating wings 10. In this embodiment, the wearable, illuminating wings can include a communication system, for example in the housing 20, that allows the wearable, illuminating wings to respond to and communicate with the remote.

While several embodiments of the present invention have been shown and described, it is understood that many changes and modifications can be made thereto without departing from the scope of the inventions as disclosed herein.

LISTING OF ELEMENTS

Wearable, illuminating wings 10
Housing 20
Front cover 22
Back cover 24
Battery compartment 26
Batteries (not shown)
Battery compartment door 27
Cavities 28
Openings 30
Changeable aesthetic panel 32
Right, inner surface of the front cover 34
Left, inner surface of the front cover 36
Right, inner surface of the back cover 37
Left, inner surface of the back cover 38
Cradles 39
Bases 40
Front casing 42
Back casing 44
Inner portion of front casing 46
Inner portion of back casing 48
Spring-loaded hinges 50
Primary knuckle 52
Pin 54
Secondary knuckle 55
Tertiary knuckle 56
Springs 57
Front casing stopper 58
Back casing stopper 59
LEDs 60
Printed circuit board 66
Wiring 67
Switch 68
Straps 69
Wings 70
Foundation 72
Slots 74
Structured bodies 76
Veins 78
Edge 80
Open portions 82
Closed portions 84

What is claimed:

1. Wearable, illuminating wings comprising:
a housing comprising a front and back cover that are securable to each other, wherein the front cover contains cavities and the back cover contains openings, wherein the openings of the back cover align with the cavities of the front cover when the back and front cover are secured together, and wherein, when the front cover is secured to the back cover, cradles are formed;
straps, each comprising a first and second end, wherein the first end is secured to a top portion of the front cover and the second end is connected to a bottom portion of the front cover;
wings, comprising a base and a wing structured body;
wherein the base for each of the wings comprises front and back casings that are securable to each other,
wherein a first end of each of the bases comprises a spring-loaded hinge securable within the cradles;
wherein the wing structured body comprises foundations and a shaped portion, wherein the foundations are securable to the front and back casings, and wherein the shaped portions comprise veins extending from the foundations to an edge of the wings; and
LEDs securable to a surface of the front and back casings.

2. The wearable, illuminating wings of claim 1, wherein the foundations of the wings comprise slots that points towards the veins of the shaped portion.

3. The wearable, illuminating wings of claim 2, wherein the LEDs securable to the surface of the front and back casings are further connected to the slots of the foundations of the wings.

4. The wearable, illuminating wings of claim 1, wherein the shaped portions of the wings further comprise open and non-opened portions.

5. The wearable, illuminating wings of claim 1, wherein the LEDs are electrically connected to a printed circuit board that is connected to the inside surface of the front and back casings.

6. The wearable, illuminating wings of claim 1, wherein the wings are composed of a plastic material that refracts light from the LEDs.

7. The wearable, illuminating wings of claim 1, wherein the spring-loaded hinges comprise:
a primary knuckle secured to the first end of the front of the front casings;
a secondary and tertiary knuckle secured to the first end of the back casings;
wherein the primary knuckle is secured between the secondary and tertiary knuckle when the front and back casings are connected;
a pin inserted inside the primary, secondary and tertiary knuckles when the front and back casings are secured; and
springs secured around the secondary and tertiary knuckle.

8. The wearable, illuminating wings of claim 1, wherein the front cover of the housing further comprises a battery compartment comprising batteries connected therein.

9. The wearable, illuminating wings of claim 1, wherein the back cover of the housing further comprises a changeable aesthetic panel connected to an outer surface thereof.

10. The wearable, illuminating wings of claim 1, further comprising an on/off switch that is connected to the battery housing via a cable.

11. The wearable, illuminating wings of claim 1, wherein the front and back casings each further comprise a wing stopper secured to the first end of each the front and back casings.

12. Wearable, illuminating wings comprising:
- a housing comprising a front and back cover that are securable to each other, wherein the front cover contains cavities and the back cover contains openings, wherein the openings of the back cover align with the cavities of the front cover when the back and front cover are secured together, and wherein, when the front cover is secured to the back cover, cradles are formed;
- straps, each comprising a first and second end, wherein the first end is secured to a top portion of the front cover and the second end is connected to a bottom portion of the front cover;
- wings, comprising a base and a wing structured body;
- wherein the base for each of the wings comprises front and back casings that are securable to each other,
- wherein a first end of each of the bases comprises a spring-loaded hinge securable within the cradles;
- wherein the wing structured body comprises foundations and a shaped portion, wherein the foundations comprise slots and are securable to the front and back casings, and wherein the shaped portions comprise veins extending from the foundations to an edge of the wings; and
- LEDs securable to the slots on a surface of the front and back casings.

13. The wearable, illuminating wings of claim 12, wherein the slots point towards the veins of the shaped portion.

14. The wearable, illuminating wings of claim 12, wherein the spring-loaded hinges comprise:
- a primary knuckle secured to the first end of the front of the front casings;
- a secondary and tertiary knuckle secured to the first end of the back casings;
- wherein the primary knuckle is secured between the secondary and tertiary knuckle when the front and back casings are connected;
- a pin inserted inside the primary, secondary and tertiary knuckles when the front and back casings are secured; and
- springs secured around the secondary and tertiary knuckle.

15. The wearable, illuminating wings of claim 12, wherein the shaped portions of the wings further comprise open and non-opened portions.

16. The wearable, illuminating wings of claim 12, wherein the front and back casings each further comprise a wing stopper secured to the first end of each the front and back casings.

17. The wearable, illuminating wings of claim 12, wherein the LEDs are electrically connected to a printed circuit board that is connected to the inside surface of the front and back casings.

18. Wearable, illuminating wings comprising:
- a housing comprising a front and back cover that are securable to each other, wherein the front cover contains cavities and the back cover contains openings, wherein the openings of the back cover align with the cavities of the front cover when the back and front cover are secured together, and wherein, when the front cover is secured to the back cover, cradles are formed;
- straps, each comprising a first and second end, wherein the first end is secured to a top portion of the front cover and the second end is connected to a bottom portion of the front cover;
- wings, comprising a base and a wing structured body;
- wherein the base for each of the wings comprises front and back casings that are securable to each other,
- wherein a first end of each of the bases comprises a spring-loaded hinge securable within the cradles;
- wherein the spring-loaded hinges comprise:
- a primary knuckle secured to the first end of the front of the front casings;
- a secondary and tertiary knuckle secured to the first end of the back casings;
- wherein the primary knuckle is secured between the secondary and tertiary knuckle when the front and back casings are connected;
- a pin inserted inside the primary, secondary and tertiary knuckles when the front and back casings are secured; and
- springs secured around the secondary and tertiary knuckle
- wherein the wing structured body comprises foundations and a shaped portion, wherein the foundations comprise slots and are securable to the front and back casings, and wherein the shaped portions comprise veins extending from the foundations to an edge of the wings; and
- LEDs securable to the slots on a surface of the front and back casings.

19. The wearable, illuminating wings of claim 18, wherein the slots point towards the veins of the shaped portions.

20. The wearable, illuminating wings of claim 18, wherein the front and back casing each further comprise a wing stopper secured to the first end of both the front and back casings.

* * * * *